(12) United States Patent  
Bordini

(10) Patent No.: US 8,020,647 B2
(45) Date of Patent: Sep. 20, 2011

(54) STEERING CONTROL SYSTEM

(75) Inventor: Giorgio Bordini, Modena (IT)

(73) Assignee: CNH America LLC, New Holland, PA (US)

( * ) Notice: Subject to any disclaimer, the term of this patent is extended or adjusted under 35 U.S.C. 154(b) by 119 days.

(21) Appl. No.: 12/432,495

(22) Filed: Apr. 29, 2009

(65) Prior Publication Data

US 2009/0272584 A1    Nov. 5, 2009

(30) Foreign Application Priority Data

Apr. 30, 2008  (EP) .................................. 08425308

(51) Int. Cl.
*B62D 11/18* (2006.01)
(52) U.S. Cl. ........................................ 180/6.2; 180/6.44
(58) Field of Classification Search .................. 180/6.2, 180/6.44, 6.66, 6.48
See application file for complete search history.

(56) References Cited

U.S. PATENT DOCUMENTS

| | | | |
|---|---|---|---|
| 2,336,911 A | 12/1943 | Zimmerman | |
| 2,975,655 A | 3/1961 | Cox | |
| 3,371,734 A | 3/1968 | Zaunberger | |
| 3,620,319 A * | 11/1971 | Armasow et al. | 180/6.44 |
| 4,917,200 A * | 4/1990 | Lucius | 180/6.2 |
| 6,189,641 B1 * | 2/2001 | Azuma | 180/242 |
| 6,530,442 B1 * | 3/2003 | Satzler | 180/6.26 |
| 6,651,770 B2 * | 11/2003 | Abend et al. | 180/367 |
| 6,830,115 B2 * | 12/2004 | Okada et al. | 180/6.44 |

\* cited by examiner

*Primary Examiner* — Kevin Hurley

(74) *Attorney, Agent, or Firm* — Patrick M. Sheldrake; Michael G. Harms

(57) ABSTRACT

A steering system for a vehicle wherein the first and second axle shafts are driven by a power shaft powered by an engine. A differential gear is interposed between the power shaft and the first and second axle shafts. The steering system has a first hydraulic unit associated with the first axle shaft, a second hydraulic unit associated with the second axle shaft, a hydraulic circuit connecting an input of the first hydraulic unit to an output of the second hydraulic unit and an output of the first hydraulic unit to an input of said second hydraulic unit. A control unit is connected to the hydraulic circuit for varying a flow rate of hydraulic fluid in the first and second hydraulic units and an actuator associated with the control unit for controlling said control unit. The actuator is responsive to rotation of a steering wheel.

15 Claims, 4 Drawing Sheets

STEERING CONTROL SYSTEM

The present invention relates to a steering control system, particularly a hydraulic steering control system for crawlers and wheeled tractors.

BACKGROUND

Previous steering systems for land vehicles having a pair of tractor wheels or endless tracks were driven by respective axle shafts powered by a power shaft connected to an engine, a differential gear being interposed between the power shaft and the axle shaft. Each axle shaft is associated with a hydraulic unit that may act both as a hydraulic motor or a hydraulic pump. The two hydraulic units are connected together by a hydraulic circuit that connects the input of a unit to the output of the other unit. A hydraulic pump having an adjustable flow rate is connected to the hydraulic circuit for varying the flow rate of a hydraulic fluid fed to the hydraulic unit, in order to have different speed of rotation of the two hydraulic units and, consequently different speed of rotation of the axle shafts driving the tractor wheels or endless tracks.
These designs however do not incorporate how to pilot the hydraulic pump with the steering device of the vehicle, for instance by a steering wheel.

U.S. Pat. No. 3,371,734 discloses a steering system for a vehicle wherein a pair of endless tracks are driven from a common power shaft at relative speeds which may be selectively varied for turning the vehicle in one direction or the other. The steering system comprises a main power shaft coupled with an engine of the vehicle, a pair of drive shafts driving said endless tracks, transmission means including a pair of differential gear trains for powering said endless tracks, each of said differential gear trains being provided with a first input connected to the main power shaft, a second input and an output connected to the respective drive shaft. The steering system further comprises two control shafts each connected to said second input of a respective differential gear train and a torque generator comprising a hydrostatic pump-and-motor unit connected to said control shafts and responsive to a steering device for applying to said control shafts a reversible differential torque continuously variable in a range between zero and a predetermined maximum.

SUMMARY OF THE INVENTION

The invention relates to a steering system for crawlers and wheeled tractor of the type disclosed in which the hydraulic pump controlling the flow of the hydraulic fluid fed to the hydraulic units associated with the axle shafts may be piloted in a simple and economic manner by the steering device of the vehicle.

This configuration may have advantages in minimizing control power losses due to steering command while also minimizing noise transfer into the inside of cab environment and providing reactive control over steering, to have full awareness of the steering system functional conditions and yield.

The steering system for a vehicle, in particular a crawler or a wheeled tractor, has a first wheel system driven by a first axle shaft, a second wheel system is driven by a second axle shaft, said first axle shaft and said second axle shaft being driven by a power shaft powered by an engine of the vehicle, a differential gear being interposed between said power shaft and said first and second axle shafts, said steering system comprising a first hydraulic unit associated with said first axle shaft, a second hydraulic unit associated with said second axle shaft, a hydraulic circuit connecting an input of said first hydraulic unit to an output of said second hydraulic unit and an output of said first hydraulic unit to an input of said second hydraulic unit, a control unit being connected to said hydraulic circuit for varying a flow rate of a hydraulic fluid in said first hydraulic unit and said second hydraulic unit, characterized in that it further comprises actuator means associated to said control unit for controlling said control unit, said actuator means being responsive to a rotation of a steering wheel of said vehicle.

The actuator responsive to a rotation of the steering wheel of the vehicle makes possible to control the control unit of the steering system in a simple way without requiring consumption of energy.

Particularly, when it is used in a crawler, the steering system according to the invention makes possible to drive the crawler like a conventional land vehicle.

Furthermore, the steering system according to the invention may be implemented on both wheeled and crawler tractors making possible to standardize the manufacturing of both types of tractors with substantial saving of manufacturing costs.

BRIEF DESCRIPTION OF THE DRAWINGS

The invention will be better understood and implemented with reference to the attached drawings, which illustrate some embodiments thereof by way of non-limiting examples, in which.

DETAILED DESCRIPTION

Figure 1:
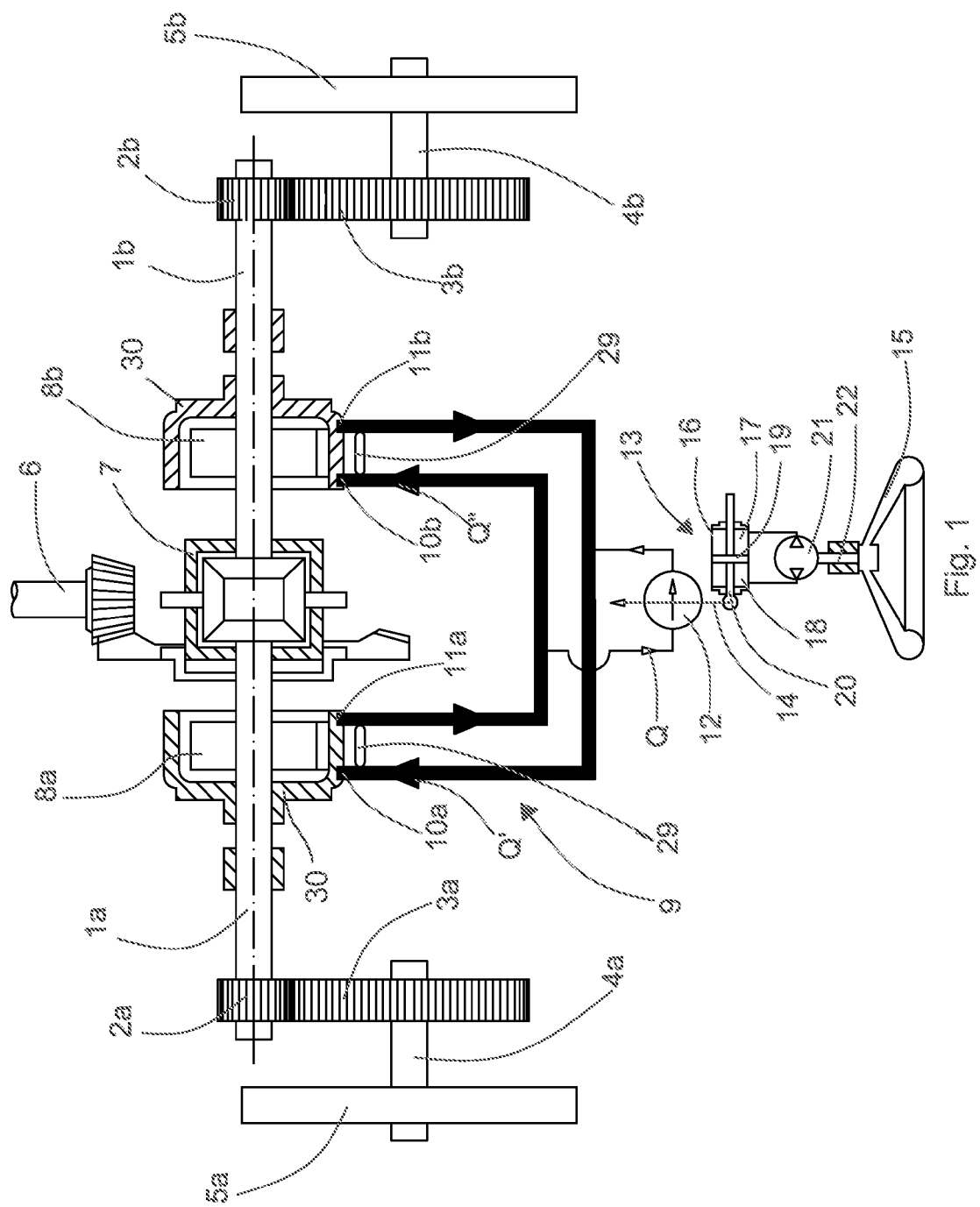
FIG. 1 shows a steering system according to the invention in a neutral position.
Figure 2:
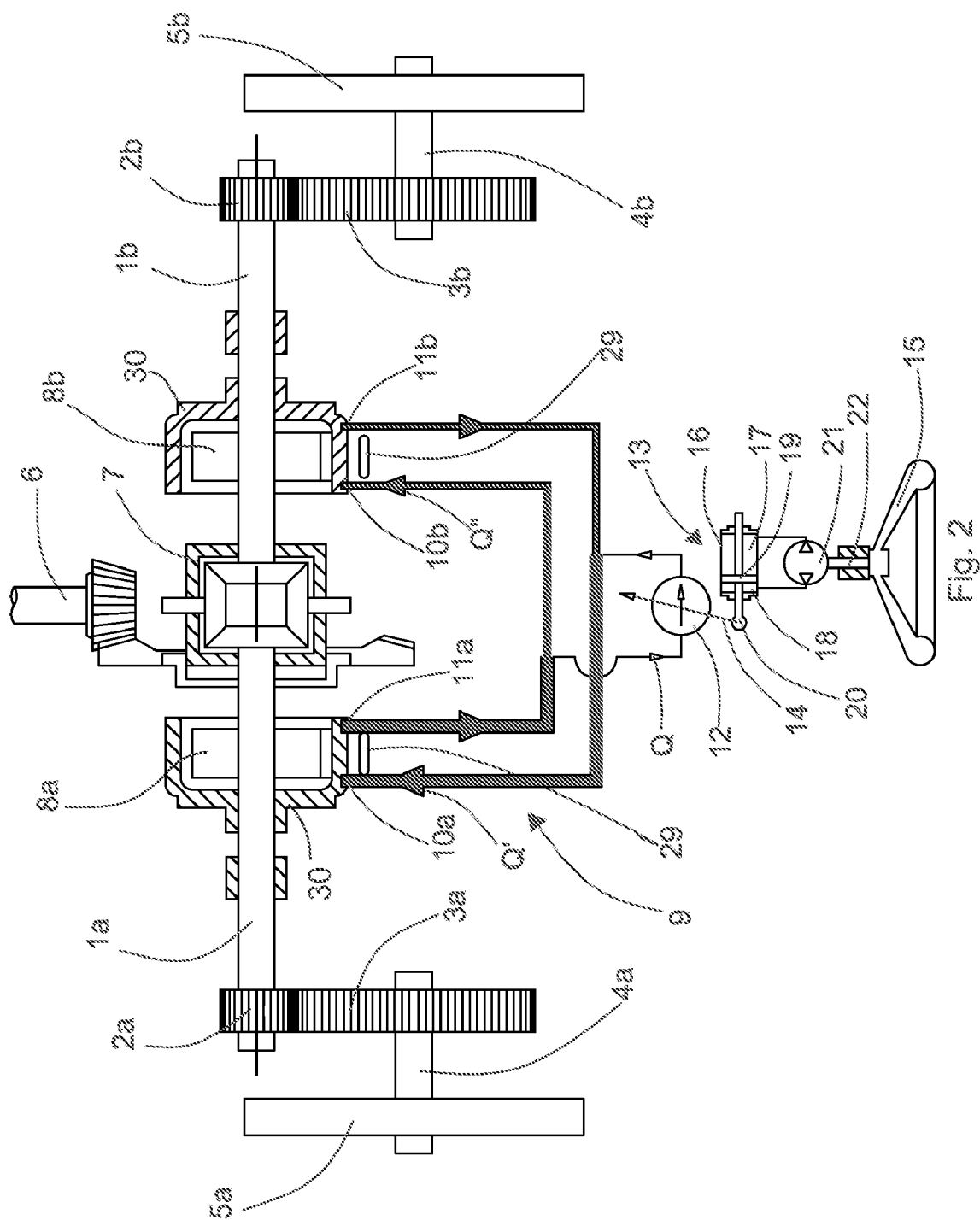
FIG. 2 shows a steering system according to the invention in a steering condition.

FIGS. 1 and 2 show a first embodiment of a steering system for a vehicle, in particular a wheeled tractor or a crawler tractor, according to the invention comprising a first axle shaft 1a driving a first pinion 2a meshing with a first spur gear 3a connected to the shaft 4a of a first wheel 5a of a vehicle, or a first drive wheel of a first endless track, a second axle shaft 1b driving a second pinion 2b meshing with a second spur gear 3b connected to the shaft 4b of a second wheel 5b of the vehicle. The first axle shaft 1a and the second axle shaft 1b are driven by a power shaft 6 powered by an engine of the vehicle. Between the power shaft 6, the first axle shaft 1a and the second axle shafts 1b a differential gearing 7 is interposed that transmit motion from the power shaft 6 to the first axle shaft 1a and the second axle shaft 1b.

The first axle shaft 1a is associated with a first hydraulic unit 8a the rotor of which is connected to the first axle shaft 1a and the second axle shaft 1b is associated with second hydraulic unit 8b the rotor of which is connected to the second axle shaft 1b.

The first hydraulic unit 8a and the second hydraulic unit 8b are hydraulically connected by a hydraulic circuit 9 that connects an output 11a of the first hydraulic unit 8a with an input 10b of the second hydraulic unit 8b and an input 10a of the first hydraulic unit 8a with an output 11b of the second hydraulic unit 8b.

The first hydraulic unit 8a and the second hydraulic unit 8b are reversible hydraulic units that can act both as hydraulic motors and as hydraulic pumps.

A control pump 12 is connected to the hydraulic circuit 9 to control the flow rate of hydraulic fluid fed to the first hydraulic unit 8a and the second hydraulic unit 8b. The control pump 12 may be a double acting positive displacement pump with a variable flow rate. The control pump 12 may be driven by the vehicle engine or by a motor powered by an external power source.

The flow rate of the control pump 12 is controlled by an actuator 13 acting on a flow rate control device 14, for instance an oscillating plate, of the pump and driven by a steering wheel 15 of the vehicle.

In a first embodiment of the invention, the actuator 13 comprises a double acting hydraulic cylinder 16 provided which a first chamber 17, a second chamber 18 and a piston 19 with may slide inside the cylinder 16 between said first chamber 17 and said second chamber 18. The piston 19 is connected to a piston rod 20 connected in its turn to the flow rate control device 14 of the control pump 12.

Conventional brake means 29, 30 may be associated to the first hydraulic unit 8a and the second hydraulic unit 8b, connected to the first axle shaft 1a and the second axle shaft 1b, respectively.

The double acting hydraulic cylinder 16 is fed with a hydraulic fluid by means of a steering pump 21 driven by the steering column 22 of the steering wheel 15 of the vehicle. When the steering wheel 15 of the vehicle is in a neutral position, corresponding to a straight motion of the vehicle, the piston 19 of the cylinder 16 is in a central position and the control pump 12 is not active, so that the output flow of the first hydraulic unit 8a is equal to the input flow of the second hydraulic unit 8b, and viceversa, and both the first hydraulic unit 8a and the second hydraulic unit 8b rotate at the same speed. Consequently both the first axle shaft 1a and the second axle shaft 1b rotate at the same speed as the first wheel 5a and the second wheel 5b, or endless tracks, of the vehicle, generating said straight motion.

By rotating the steering wheel 15 of the vehicle in a first direction, or in a second direction opposite to the first direction, the steering pump 21 displaces a quantity of hydraulic fluid from the first chamber 17 of the cylinder 16 to the second chamber 18, or viceversa, causing a displacement of the piston 19 and the piston rod 20, which causes a displacement of the control device 14 of the pump 12, which becomes active and draws out a fraction Q of the output flow of one of the hydraulic units, for instance the output flow of the first hydraulic unit 8a, and forward it to the input of the first hydraulic unit 8a. As a consequence the flow Q' in the first hydraulic unit 8a is higher than the flow Q" in the second hydraulic unit 8b so that the speed of rotation of the first hydraulic unit 8a is higher than the speed of rotation of the second hydraulic unit 8b. Therefore the first axle 1a and the first wheel 5a will rotate at a speed higher than the second axle 1b and the second wheel 5b and the vehicle will steer.

The behaviour of the steering system according to the invention may be described as follows.

If Q' and Q" are the flow rates of the hydraulic fluid in the first hydraulic unit 8a and the second hydraulic unit 8b, Q is the flow rate of the control pump 12, X is the peripheral speed of the first wheel 5a, or first endless track, Y is the peripheral speed of the second wheel 5b, or second endless track, K is a constant factor depending upon the structural features of the hydraulic units 8a and 8b, upon the transmission ratio between the pinions 2a and 2b and the respective spur gears 3a, 3b, and upon the radius of the wheels 5a, 5b, T is the vehicle track, V is the ground speed of the vehicle and R is the steering radius of the vehicle, the following relations exist:

$$Y+X=2V \quad [1]$$

$$Y=KQ' \quad [2]$$

$$X=KQ'' \quad [3]$$

$$Q'-Q''=Q \quad [4]$$

$$(R+T/2)Y=(R-T/2)/X \quad [5]$$

By combining equations [1], [2], [3] and [4] we obtain:

$$Q'=Y/K=(2V-X)/K \quad [6]$$

$$Q''=X/K \quad [7]$$

$$Q=(2V-X)/K-X/K=2(V-X)/K \quad [8]$$

Using equations [8] and [1] we can finally calculate the peripheral speed Y of the first wheel 5a and the peripheral speed X of the second wheel 5b as a function of the flow rate Q of the control pump 12 as follows:

$$Y=V+KV/2 \quad [9]$$

$$X=V-KQ/2 \quad [10]$$

In addition, using equations [5], [9] and [10] we may obtain a relationship existing between the flow rate Q of the control pump 12 and the steering radius of the vehicle:

$$R=TV/KQ \quad [11]$$

As can be seen from equation [11] the steering radius R of the vehicle is directly proportional to the speed V of the vehicle, in other words the steering radius is "sensitive" to the speed of the vehicle, so that the steering radius R increases as the speed of the vehicle increases. This is particularly advantageous for preventing overturning of the vehicle during steering.

In addition the steering radius R is inversely proportional to the flow rate of the control pump 12. Since the flow rate of the control pump 12 is proportional to the steering angle of the steering wheel 15, the steering radius R depends on the steering angle of the steering wheel 15.

Figure 3:
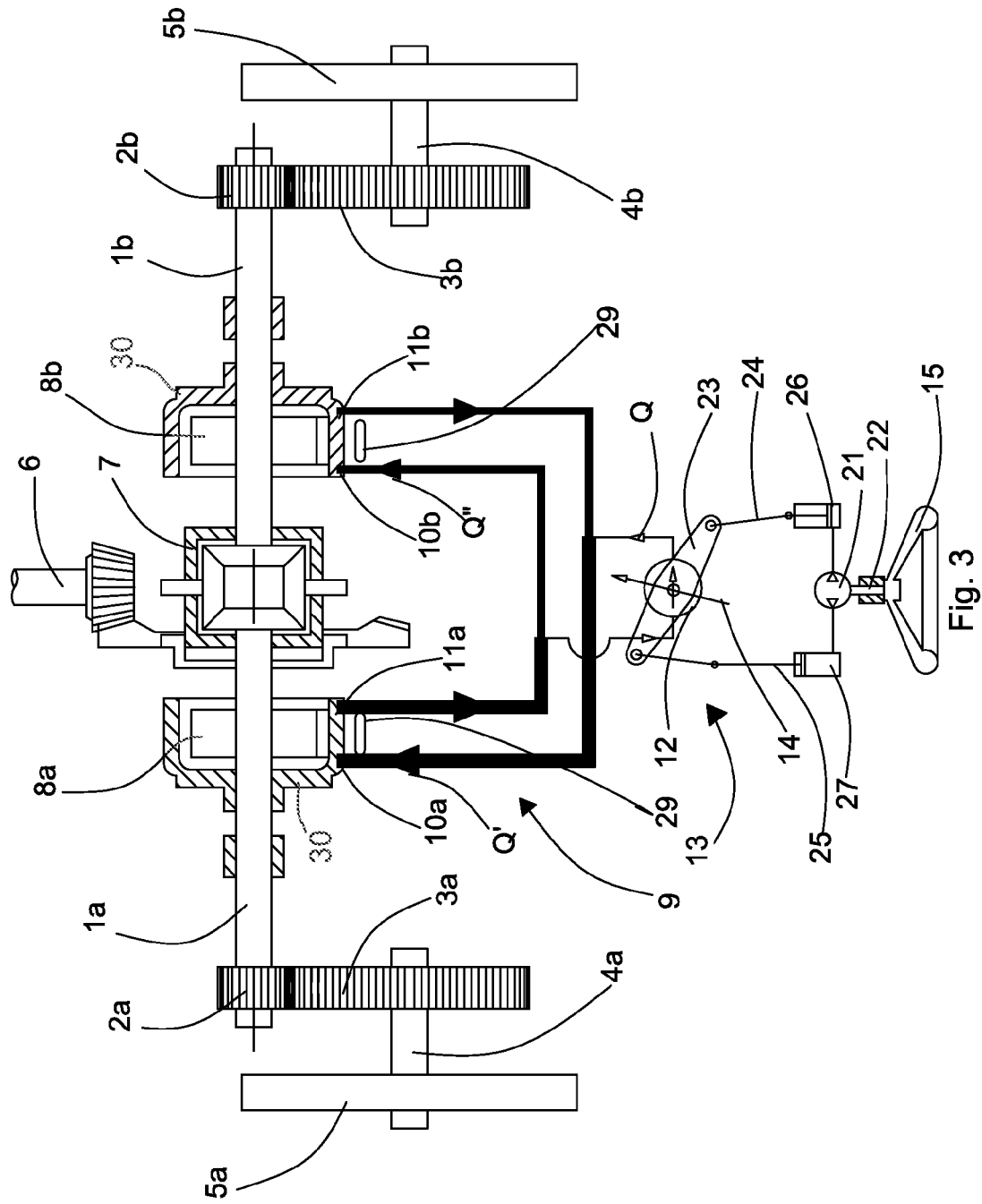
FIG. 3 is a variation of a steering system according to the invention in a steering condition.

FIG. 3 illustrates a second embodiment of a steering system according to the invention in which the control device 14 of the control pump 12 is piloted by a lever 23 the ends of which are connected to respective piston rods 24 and 25 of a first hydraulic cylinder 26 and a second hydraulic cylinder 27, respectively, that are fed by the steering pump 21 driven by the steering column 22 of the steering wheel 15 of the vehicle.

When the steering wheel 15 is rotated in a first direction, or in a second direction opposite to the first direction, the steering pump 21 displaces a quantity of hydraulic fluid from the first hydraulic cylinder 26 to the second hydraulic cylinder 27, or viceversa, causing displacement of the piston rods 24 and 25 in opposite directions, which causes a rotation of the lever 23 and a consequent displacement of the control device 14 of the control pump 12 and a variation of the flow rate Q of the control pump and the flow rates Q' of the first hydraulic unit 8a and Q" of the second hydraulic unit 8b as explained above with reference to the first embodiment of the invention.

Figure 4:
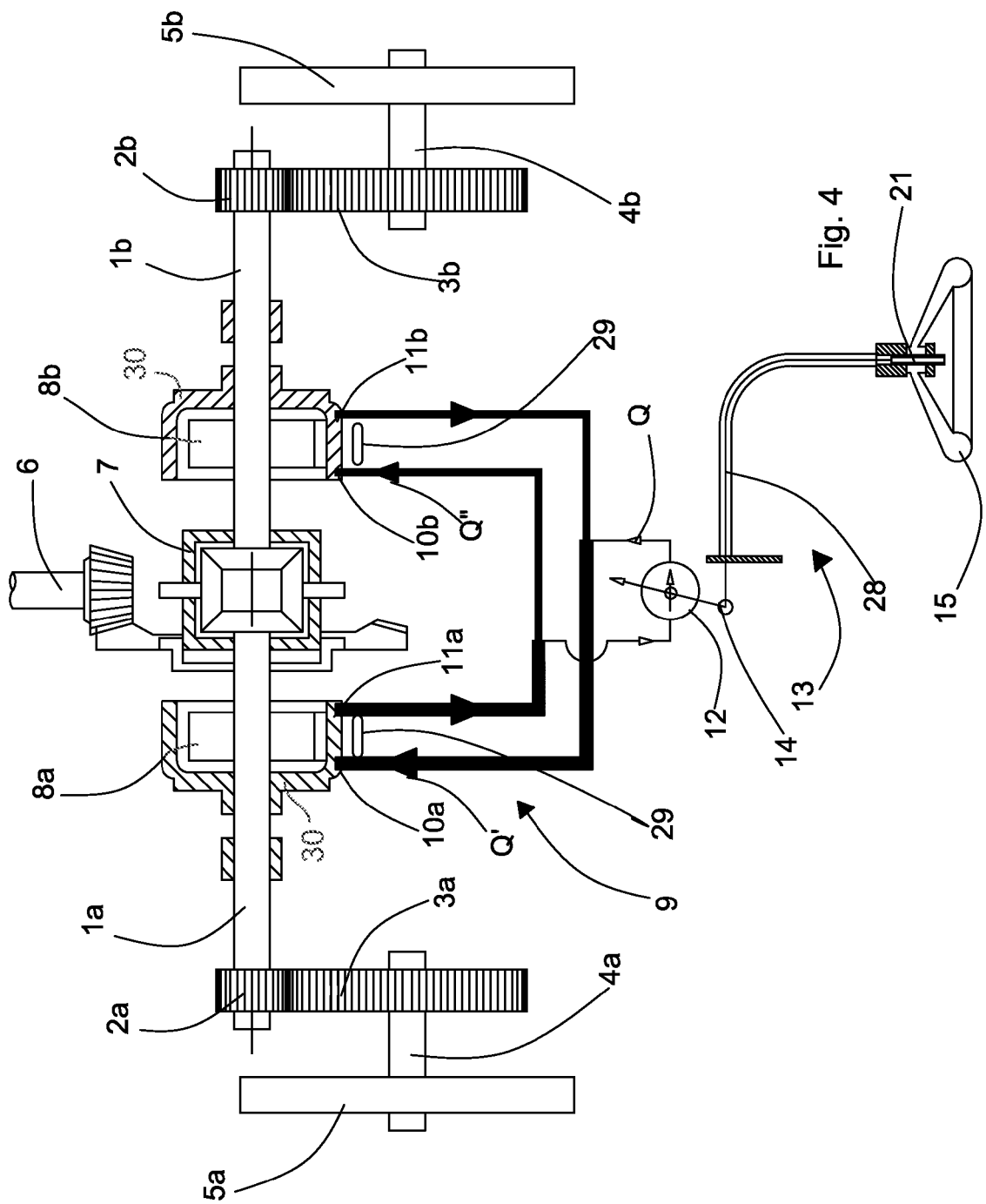
FIG. 4 is a further variation of a steering system according to the invention in a steering condition.

FIG. 4 illustrates a third embodiment of a system according to the invention wherein the control device 14 of the control pump 12 is driven by a flexible cable 28 connected to the steering column 21 of the steering wheel 15 of the vehicle.

Alternatively, the control device 14 of the control pump 12 may be driven by a tie-rod connected to the steering wheel 15 of the vehicle.

I claim:

1. A steering control system for a vehicle wherein a first wheel system is driven by a first axle shaft, a second wheel system is driven by a second axle shaft, said first axle shaft and said second axle shaft being driven by a power shaft powered by an engine of the vehicle, a differential gear being interposed between said power shaft and said first and second axle shafts, said steering system comprising:
   a first hydraulic unit associated with said first axle shaft, a second hydraulic unit associated with said second axle shaft, a hydraulic circuit connecting an input of said first hydraulic unit to an output of said second hydraulic unit and an output of said first hydraulic unit to an input of said second hydraulic unit, a control unit connected to said hydraulic circuit and configured for varying a flow rate of an hydraulic fluid in said first hydraulic unit and said second hydraulic unit; and
   an actuator for controlling said control unit, said actuator responsive to a rotation of a steering wheel of said vehicle;
   the control unit comprising a double acting positive displacement control pump with a variable flow rate;
   said actuator comprising a double acting hydraulic cylinder that drives said flow rate control device of the control pump.

2. A steering control system according to claim 1, wherein said double acting hydraulic cylinder has a piston rod mechanically connected to said flow rate control device.

3. A steering control system according to claim 1, wherein said double acting hydraulic cylinder is fed by a steering pump driven by a steering column of the steering wheel of the vehicle.

4. A steering control system for a vehicle wherein a first wheel system is driven by a first axle shaft, a second wheel system is driven by a second axle shaft, said first axle shaft and said second axle shaft being driven by a power shaft powered by an engine of the vehicle, a differential gear being interposed between said power shaft and said first and second axle shafts, said steering system comprising:
   a first hydraulic unit associated with said first axle shaft, a second hydraulic unit associated with said second axle shaft, a hydraulic circuit connecting an input of said first hydraulic unit to an output of said second hydraulic unit and an output of said first hydraulic unit to an input of said second hydraulic unit, a control unit connected to said hydraulic circuit and configured for varying a flow rate of an hydraulic fluid in said first hydraulic unit and said second hydraulic unit; and
   an actuator for controlling said control unit, wherein the actuator is responsive to rotation of a steering wheel of said vehicle, the actuator comprising at least one hydraulic cylinder configured to drive said flow rate control device.

5. A steering control system according to claim 4, wherein said control unit comprises a control pump.

6. A steering control system according to claim 5, wherein said control pump is a double acting positive displacement pump with variable flow rate.

7. A steering control system according to claim 6, wherein said actuator is configured to act on a flow rate control device of said control pump.

8. A steering control system according to claim 7, wherein said flow rate control device comprises a lever device.

9. A steering control system according to claim 4, wherein said at least one hydraulic cylinder comprises a double acting hydraulic cylinder that drives said flow rate control device.

10. A steering control system according to claim 9, wherein said double acting hydraulic cylinder has a piston rod mechanically connected to said flow rate control device.

11. A steering control system according to claim 9, wherein said double acting hydraulic cylinder is fed by a steering pump driven by a steering column of the steering wheel of the vehicle.

12. A steering control system according to claim 4, wherein said at least one cylinder comprises a first hydraulic cylinder and a second hydraulic cylinder that drive said flow rate control device.

13. A steering control system according to claim 12, wherein said first hydraulic cylinder and second hydraulic cylinder have respective piston rods connected to opposite ends of a lever driving said flow rate control device.

14. A steering control system according to claim 12, wherein said first hydraulic cylinder and second hydraulic cylinder are fed by a steering pump driven by a steering column of the steering wheel of the vehicle.

15. A steering control system for a vehicle wherein a first wheel system is driven by a first axle shaft, a second wheel system is driven by a second axle shaft, said first axle shaft and said second axle shaft being driven by a power shaft powered by an engine of the vehicle, a differential gear being interposed between said power shaft and said first and second axle shafts, said steering system comprising:
   a first hydraulic unit associated with said first axle shaft, a second hydraulic unit associated with said second axle shaft, a hydraulic circuit connecting an input of said first hydraulic unit to an output of said second hydraulic unit and an output of said first hydraulic unit to an input of said second hydraulic unit, a control unit connected to said hydraulic circuit and configured for varying a flow rate of an hydraulic fluid in said first hydraulic unit and said second hydraulic unit; and
   an actuator for controlling said control unit, wherein the actuator is responsive to rotation of a steering wheel of said vehicle, said actuator comprising a flexible cable connected to and configured for driving said flow rate control device, wherein said flexible cable is also connected to and configured to be driven by the steering wheel of the vehicle.

* * * * *